(12) United States Patent
Lam et al.

(10) Patent No.: US 11,581,913 B2
(45) Date of Patent: Feb. 14, 2023

(54) ACTIVE 1:N BREAKOUT CABLE

(71) Applicant: CREDO TECHNOLOGY GROUP LTD, Grand Cayman (KY)

(72) Inventors: Yattung Lam, San Jose, CA (US); Baohua Chen, Xiamen (CN); Yifei Dai, Shanghai (CN); William J. Brennan, San Jose, CA (US)

(73) Assignee: CREDO TECHNOLOGY GROUP LTD, Grand Cayman (KY)

( * ) Notice: Subject to any disclaimer, the term of this patent is extended or adjusted under 35 U.S.C. 154(b) by 0 days.

(21) Appl. No.: 17/301,819

(22) Filed: Apr. 15, 2021

(65) Prior Publication Data

US 2021/0234567 A1    Jul. 29, 2021

Related U.S. Application Data

(62) Division of application No. 16/541,094, filed on Aug. 14, 2019, now Pat. No. 11,018,709.

(30) Foreign Application Priority Data

Mar. 1, 2019    (CN) .......................... 201910155916.7

(51) Int. Cl.
*H04B 1/38* (2015.01)
*H04L 1/00* (2006.01)
*H04L 7/00* (2006.01)

(52) U.S. Cl.
CPC ............... *H04B 1/38* (2013.01); *H04L 1/004* (2013.01); *H04L 7/0016* (2013.01)

(58) Field of Classification Search
CPC .......... H04B 1/38; H04B 1/004; H04L 7/0016
(Continued)

(56) References Cited

U.S. PATENT DOCUMENTS 7,401,985 B2    7/2008  Aronson et al.
9,184,906 B1 *  11/2015  Min ...................... H04L 7/0334
(Continued)

FOREIGN PATENT DOCUMENTS

WO    2018161273 A1    9/2018

OTHER PUBLICATIONS

Management Data Input/Output. (Nov. 25, 2018). Wikiepedia. Retrieved Jan. 23, 2019, from https://en.wikipedia.org/wiki/Management_Data_Input/Output.
(Continued)

*Primary Examiner* — Ted M Wang
(74) *Attorney, Agent, or Firm* — Ramey LLP; Daniel J. Krueger (57) ABSTRACT

Accordingly, there are disclosed herein active cables and methods that enable direct connection between different generations of network interface ports or ports supporting different standards. One illustrative embodiment is an active 1:N breakout cable that includes a unary end connector connected by electrical conductors to each of multiple split end connectors. The unary end connector is adapted to fit into a network interface port of a primary host device to provide output PAM4 electrical signals that convey a multi-lane outbound data stream to the primary host device and to accept input PAM4 electrical signals that convey multi-lane inbound data stream from the primary host device. Each of the split end connectors is adapted to fit into a network interface port of a secondary host device to provide output NRZ electrical signals that convey a split portion of the inbound data stream to that secondary host device and to accept input NRZ electrical signals that convey a split portion of the outbound data stream from that secondary host device.

19 Claims, 3 Drawing Sheets

(58) Field of Classification Search
USPC .......................................................... 375/220
See application file for complete search history.

(56) References Cited

U.S. PATENT DOCUMENTS

| | | |
|---|---|---|
| 9,322,704 B1 | 4/2016 | Neveux |
| 9,337,993 B1 | 5/2016 | Lugthart |
| 10,877,233 B1 | 12/2020 | Dai et al. |
| 2007/0237464 A1 | 10/2007 | Aronson et al. |
| 2013/0343400 A1 | 12/2013 | Lusted et al. |
| 2014/0086264 A1 | 3/2014 | Lusted et al. |
| 2014/0146833 A1 | 5/2014 | Lusted et al. |
| 2015/0334186 A1 | 11/2015 | Chen |
| 2020/0280329 A1 | 9/2020 | Lam et al. |
| 2020/0280458 A1 | 9/2020 | Lam et al. |

OTHER PUBLICATIONS

QSFP-DD MSA—QSFP-DD Hardware Specification for QSFP Double Density 8X Pluggable Transceiver Rev 4.0 Candidate. Aug. 15, 2018.

IEEE P802.3cd/D1.2, Feb. 3, 2017 (Amendment of IEEE Std 802.3-2015 as amended) IEEE Draft Standard for Ethernet Amendment: Media Access Control Parameters for 50 Gb/s, 100 Gb/s and 200 Gb/s Operation. The Institute of Electrical and Electronics Engineers, Inc., 2017; S.I.: IEEE.

Rumer, B. "Fighting Jitter in Fibre-Channel Designs." Electronic Engineering Times, (Feb. 1, 2001). Retrieved Aug. 13, 2019, from https://www.eetimes.com/document asp?doc_id=1277249.

40 Gigabit Ethernet, 40G QSFP+, 40GBASE-LR4, 40G-BASE-SR4, CFP module, CXP Transceiver, MPO MTP Fiber on May 25, 2015 [http://www.cables-solutions.com/guide-to-40-gigabit-ethernet-options.html].

Notice of Allowance dated Jun. 24, 2020 for U.S. Appl. No. 16/539,910.

* cited by examiner

ACTIVE 1:N BREAKOUT CABLE

CROSS-REFERENCE TO RELATED APPLICATIONS

The present application is a divisional of co-pending U.S. application Ser. No. 16/541,094, filed Aug. 14, 2019 and titled "ACTIVE 1:N BREAKOUT CABLE" by inventors Yattung LAM, Baohua CHEN, Yifei DAI and William J. Brennan; claiming priority to Chinese Patent Application No. 201910155916.7 filed Mar. 1, 2019, which are both hereby incorporated by reference in their entirety.

BACKGROUND

The Institute of Electrical and Electronics Engineers (IEEE) Standards Association publishes an IEEE Standard for Ethernet, IEEE Std 802.3-2015, which will be familiar to those of ordinary skill in the art to which this application pertains. This Ethernet standard provides a common media access control specification for local area network (LAN) operations at selected speeds from 1 Mbps to 100 Gbps over coaxial cable, twinaxial cable, twisted wire pair cable, fiber optic cable, and electrical backplanes, with various channel signal constellations. As demand continues for ever-higher data rates, the standard is being extended. Such extensions to the standard must account for increased channel attenuation and dispersion even as the equalizers are forced to operate at faster symbol rates. As the standard is extended, however, it may not be directly inter-operable with the current-generation. For example, there exists no way to directly couple current generation 100 Gbps Ethernet ports to proposed next generation 400 Gbps Ethernet ports.

SUMMARY

Accordingly, there are disclosed herein active cables and methods that enable direct connection between different generations of network interface ports or ports supporting different standards. One illustrative embodiment is an active 1:N breakout cable that includes a unary end connector connected by electrical conductors to each of multiple split end connectors. The unary end connector is adapted to fit into a network interface port of a primary host device to provide output PAM4 electrical signals that convey a multi-lane outbound data stream to the primary host device and to accept input PAM4 electrical signals that convey multi-lane inbound data stream from the primary host device. Each of the split end connectors is adapted to fit into a network interface port of a secondary host device to provide output NRZ electrical signals that convey a split portion of the inbound data stream to that secondary host device and to accept input NRZ electrical signals that convey a split portion of the outbound data stream from that secondary host device.

Another illustrative embodiment is a cable manufacturing method that includes: packaging a transceiver into a unary end connector that is adapted to mate with a network interface port of a primary host device; and connecting each of multiple split end connectors to the unary end connector with electrical conductors. Each of the split end connectors is adapted to mate with a network interface port of a secondary host device to provide output NRZ electrical signals that convey a split portion of a multi-lane inbound data stream to that secondary host device and to accept input NRZ electrical signals that convey a split portion of a multi-lane outbound data stream from that secondary host device. The transceiver is configured to provide output PAM4 electrical signals that convey the outbound data stream to the primary host device and to accept input PAM4 electrical signals that convey the inbound data stream from the primary host device. The transceiver is further configured to perform clock and data recovery on the input PAM4 electrical signals to extract and re-modulate the inbound data stream as diverging transit signals that transport the split portions of the inbound data stream via the electrical conductors to the split end connectors, and to perform clock and data recovery on converging transit signals to extract and re-modulate the outbound data stream as said output PAM4 electrical signals.

Yet another illustrative embodiment is a cable manufacturing method that includes: packaging a transceiver into each of multiple split end connectors adapted to mate with a network interface port of a secondary host device; and connecting each of the split end connectors to a unary end connector via electrical conductors. The unary end connector is adapted to mate with a network interface port of a primary host device to provide output PAM4 electrical signals that convey a multi-lane outbound data stream to the primary host device and to accept input PAM4 electrical signals that convey a multi-lane inbound data stream from the primary host device. Each of the transceivers in the split end connectors is configured to provide output NRZ electrical signals that convey a split portion of the inbound data stream to that secondary host device and to accept input NRZ electrical signals that convey a split portion of the outbound data stream from that secondary host device. The transceiver in each split end connector is further configured to perform clock and data recovery on the input NRZ electrical signals to extract and re-modulate the split portion of the outbound data stream as converging transit signals that transport the split portions of the outbound data stream via the electrical conductors to the unary end connector, and to perform clock and data recovery on diverging transit signals to extract and re-modulate the split portion of the inbound data stream as said output NRZ electrical signals.

Still another illustrative embodiment is an active 1:N breakout cable that includes a unary end connector connected by electrical conductors to each of N split end connectors, N being an integer greater than 1. The unary end connector is adapted to fit into a network interface port of a primary host device to provide first output electrical signals that convey a multi-lane outbound data stream to the primary host device at a first symbol rate and to accept first input electrical signals that convey multi-lane inbound data stream from the primary host device at the first symbol rate. Each of the split end connectors is adapted to fit into a network interface port of a secondary host device to provide second output electrical signals that convey a split portion of the inbound data stream to that secondary host device at a second symbol rate and to accept second input electrical signals that convey a split portion of the outbound data stream from that secondary host device at the second symbol rate, the second symbol rate being half of the first symbol rate.

Still yet another illustrative embodiment is a cable manufacturing method that includes: packaging a transceiver into a unary end connector that is adapted to mate with a network interface port of a primary host device; and connecting each of N split end connectors to the unary end connector with electrical conductors, where N is an integer greater than one. Each of the split end connectors is adapted to mate with a network interface port of a secondary host device to provide second output electrical signals that convey a split portion of the inbound data stream to that secondary host device at a second symbol rate and to accept second input electrical signals that convey a split portion of the outbound data stream from that secondary host device at the second symbol rate. The transceiver is configured to provide first output electrical signals that convey a multi-lane outbound data stream to the primary host device at a first symbol rate and to accept first input electrical signals that convey multi-lane inbound data stream from the primary host device at the first symbol rate that is twice the second symbol rate. The transceiver is further configured to perform clock and data recovery on the first input electrical signals to extract and re-modulate the inbound data stream as diverging transit signals that transport the split portions of the inbound data stream via the electrical conductors to the split end connectors, and to perform clock and data recovery on converging transit signals to extract and re-modulate the outbound data stream as said first output electrical signals.

Yet still another illustrative embodiment is a cable manufacturing method that includes: packaging a transceiver into each of N split end connectors adapted to mate with a network interface port of a secondary host device, where N is an integer greater than one; and connecting each of the split end connectors to a unary end connector via electrical conductors. The unary end connector is adapted to mate with a network interface port of a primary host device to provide unary end output electrical signals that convey the outbound data stream to the primary host device at a first symbol rate and to accept unary end input electrical signals that convey the inbound data stream from the primary host device at the first symbol rate. Each of the transceivers in the split end connectors is configured to provide split end output electrical signals that convey a split portion of a multi-lane inbound data stream to that secondary host device at a second symbol rate that is half the first symbol rate and to accept split end input electrical signals that convey a split portion of a multi-lane outbound data stream from that secondary host device at the second symbol rate. Each of the transceivers is further configured to perform clock and data recovery on the split end input electrical signals to extract and re-modulate the split portion of the outbound data stream as converging transit signals that transport the split portions of the outbound data stream via the electrical conductors to the unary end connector, and to perform clock and data recovery on diverging transit signals to extract and re-modulate the split portion of the inbound data stream as said split end output electrical signals.

Each of the foregoing embodiments may be implemented individually or in combination, and may be implemented with one or more of the following features in any suitable combination: 1. the unary end connector includes a transceiver that performs clock and data recovery on the input PAM4 electrical signals to extract and re-modulate the inbound data stream as diverging transit signals that transport the split portions of the inbound data stream via the electrical conductors to the split end connectors. 2. the transceiver in the unary end connector performs clock and data recovery on converging transit signals to extract and re-modulate the outbound data stream as said output PAM4 electrical signals. 3. the diverging transit signals and the converging transit signals are NRZ electrical signals. 4. the diverging transit signals and the converging transit signals are PAM4 electrical signals. 5. each of the split end connectors includes a redriver circuit that provides the output NRZ electrical signals by amplifying the diverging transit signals that it receives. 6. the redriver circuit provides at least one of the converging transit signals by amplifying the input NRZ electrical signals that it receives. 7. each of the split end connectors includes a transceiver that performs clock and data recovery on the diverging transit signals that it receives to extract and re-modulate the split portion of the inbound data stream. 8. the transceiver in each split end connector performs clock and data recovery on the input NRZ electrical signals to extract and re-modulate the split portion of the outbound data stream. 9. the transceiver in each split end connector further performs forward error correction when extracting the split portion of the inbound data stream. 10. the transceiver in the unary end connector further performs forward error correction when extracting the outbound data stream. 11. packaging a redriver circuit into each of the split end connectors. 12. packaging a transceiver into each of the split end connectors. 13. packaging a transceiver in the unary end connector.

DETAILED DESCRIPTION

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

Figure 1:
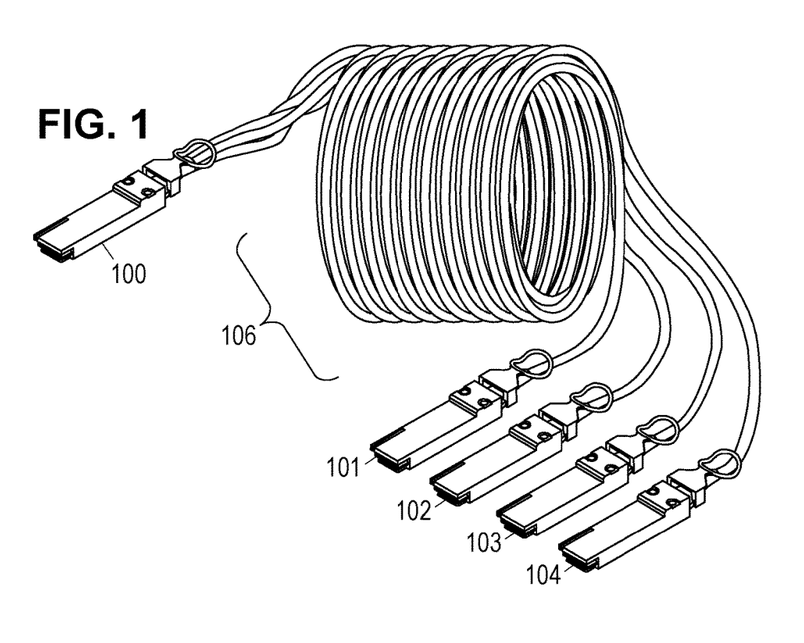
FIG. 1 is a perspective view of an illustrative active 1:N breakout cable.

FIG. 1 is a perspective view of an illustrative 1:4 breakout cable that may be used to provide a high-bandwidth communications link between devices in a routing network. The routing network may be or include, for example, the Internet, a wide area network, or a local area network. The linked devices may be computers, switches, routers, hubs, and the like. The breakout cable includes unary end connector 100 electrically connected via conductors 106 to multiple split end connectors 101-104. The unary end may also be referred to, among other things, as the common end, the unsplit end, or the primary host end, and it is designed to communicate with the network interface of a host at N times the data rate of the split end connectors, where N is the number of split end connectors. The split end connectors may be referred to, among other things, as the breakout end, divided end, legacy end, or secondary host end, and it is designed to communicate with the network interface of a host at 1/N times the data rate of the unary end connector.

The electrical conductors may be provided in a paired form such as with twinaxial conductors. Twinaxial conductors can be likened to coaxial conductors, but with two inner conductors instead of one. The inner conductors may be driven with a differential signal and their shared shield operates to reduce crosstalk with other twinaxial conductors in the cable. Depending on the performance criteria, it may be possible to employ other paired or single-ended conductor implementations. Paired conductors may provide unidirectional transport of a differential signal.

In one contemplated 1:4 breakout cable embodiment, the unary end connector is a quad small form factor pluggable double density (QSFP-DD) connector or an octal small form factor pluggable (OSFP) connector configured to provide and accept 400 Gbps in the form of 8 lanes of 50 Gbps PAM4 electrical signals. The four split end connectors are quad small form factor pluggable rated up to 28 Gbps/lane (QSFP28) connectors, each configured to provide and accept 100 Gbps in the form of 4 lanes of 25 Gbps NRZ electrical signals. Thus, this contemplated embodiment includes a "gearbox" module that converts between 50 Gbps PAM4 electrical signals and 25 Gbps NRZ electrical signals. However, any connector that complies with the Ethernet standard or other network communications standard may be used.

In another contemplated 1:2 breakout cable embodiment, the unary end connector is configured to provide and accept 400 Gbps in the form of 4 lanes of 100 Gbps PAM4 electrical signals. The two split end connectors are each configured to provide and accept 200 Gbps in the form of 4 lanes of 50 Gbps PAM4 electrical signals. Thus, this contemplated embodiment includes a gearbox module that converts between lane pairs of 50 Gbps PAM4 electrical signals and individual lanes of 100 Gbps PAM4 electrical signals.

In yet another contemplated 1:2 breakout cable embodiment, the unary end connector is configured to provide and accept 80 Gbps in the form of 4 lanes of 20 Gbps NRZ electrical signals. The two split end connectors are each configured to provide and accept 40 Gbps in the form of 4 lanes of 10 Gbps NRZ electrical signals. Thus, this contemplated embodiment includes a gearbox module that converts between lane pairs of 10 Gbps NRZ electrical signals and individual lanes of 20 Gbps NRZ electrical signals.

To provide PAM4-NRZ and/or 2-to-1 lane+rate conversion while enabling robust performance, the unary end connector and/or the split end connectors may include a powered transceiver that performs clock and data recovery (CDR) and re-modulation of data streams in each direction. Notably, the transceiver would perform CDR and re-modulation not only of the outbound data streams as they exit the cable, but also of the inbound data streams as they enter the cable. (Though used here for both unary and split end connectors, the terms "inbound" and "outbound" as used in the claims will be defined with respect to the unary end connector 100, such that the "inbound" data stream is the data stream entering the cable at the unary end connector and gets divided among the split end connectors where split portions of the inbound data stream exit the cable. Conversely, the "outbound" data stream is the data stream exiting the cable at the unary end connector after being assembled from split portions that have entered the cable at the split ends.)

It is acknowledged here that the data streams entering the cable may be expected to be compliant with the relevant standard and may be expected to have experienced essentially no deterioration from their traversal of the network interface port's receptacle pins and the connector's plug pins. Nevertheless, the modulation quality and equalization strategy employed by the electronics manufacturer of the transmitting network interface is generally unknown and the minimum requirements of the standard may be inadequate for transport over an extended cable length, particularly if the electronics manufacturer of the receiving network interface is different than that of the transmitting network interface. As with the transmitting network interface, the equalization and demodulation strategy employed by the electronics manufacturer of the receiving network interface is generally unknown and may be unable to cope with the attenuation and interference caused by signal transport over an extended cable length. At least some of the contemplated embodiments perform CDR and re-modulation of both entering and exiting data streams at each end to assure consistently robust data transfer over even extended cable lengths without consideration of the electronics manufacturers of the network interfaces.

Figure 2A:
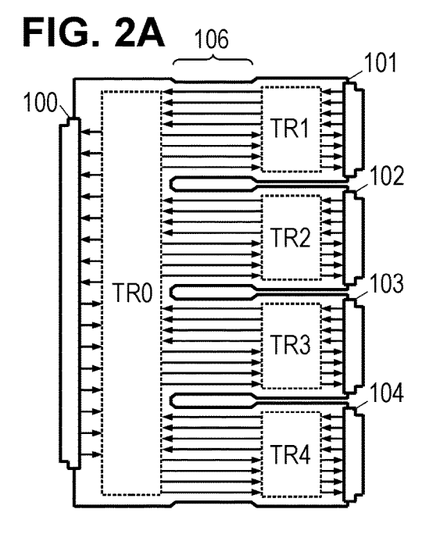
FIG. 2A is schematic view of one illustrative breakout cable embodiment.

FIG. 2A is a schematic view of one contemplated active 1:4 breakout cable embodiment. An integrated circuit TR0 is packaged in the unary end connector 100, while each of the split end connectors 101-104 includes a respective integrated circuit TR1-TR4. Integrated circuit TR0 may be soldered to a printed circuit board that connects a host-facing side of the integrated circuit to the pins of the unary end connector 100 and a cable-facing side of the integrated circuit to the electrical conductors 106. Similarly each of the integrated circuits TR1-TR4 may be soldered to a printed circuit board that connects the host-facing sides of the integrated circuits to the pins of the split end connectors 101-104 and the cable-facing sides of the integrated to the electrical conductors 106. In at least some embodiments, all of the integrated circuits TR0-TR4 are transceivers that perform CDR and re-modulation of data streams traveling in both directions. In other embodiments, either integrated circuit TR0 or integrated circuits TR1-TR4 are redrivers (analog linear amplifiers) that operate on signals that have been attenuated during transport over the conductors 106, and which may further operate on signals about to be transmitted over the conductors to pre-compensate for at least some of that attenuation. In still other embodiments, either integrated circuit TR0 or integrated circuits TR1-TR4 are omitted in favor of direct connections between the conductors 106 and the connector pins.

FIG. 2A shows a contemplated cable embodiment in which the unary end connector 100 includes a transceiver TR0 with a gearbox module. The host-facing side of the transceiver TR0 provides and accepts 8 lanes of 50 Gbps PAM4 electrical signals. The cable-facing side of the transceiver TR0 provides and accepts 16 lanes of 25 Gbps NRZ electrical signals. The 16 lanes are apportioned four-apiece to the split end connectors 101-104. A potential advantage of this embodiment is that the 25 Gbps NRZ electrical signals may tolerate attenuation and interference better than 50 Gbps PAM4 signals, thereby providing more robust performance and potentially enabling the use of redrivers or direct connections in the split end connectors 101-104. Alternatively, the integrated circuits TR1-TR4 may be transceivers that accept and provide 4 lanes of 25 Gbps NRZ electrical signals on both the host-facing and cable-facing sides.

Figure 2B:
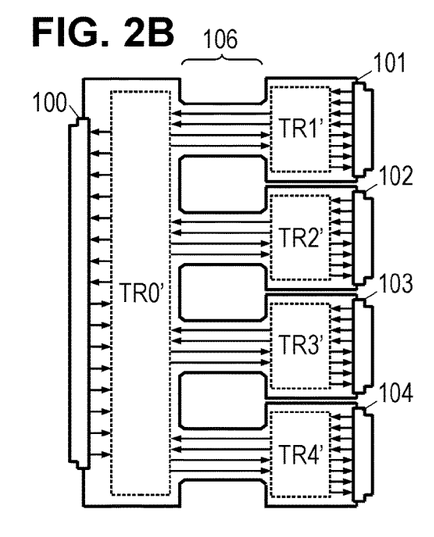
FIG. 2B is schematic view of a second illustrative breakout cable embodiment.

FIG. 2B shows an alternative cable embodiment in which the split end connectors 101-104 each include a transceiver (TR1'-TR4') having a gear box module. The host-facing sides of the transceivers TR1-TR4 provide and accept 4 lanes of 25 Gbps NRZ electrical signals. The cable-facing sides of these transceivers provide and accept 2 lanes of 50 Gbps PAM4 electrical signals, which combine to supply the unary end connector with 8 lanes of 50 Gbps PAM4 electrical signals. A potential advantage of this embodiment is that it requires fewer conductors 106. Greater cost savings may be further achieved by using a redriver or direct connections in the unary end connector 100. Alternatively, the integrated circuit TR0' may be a transceiver that accepts and provides 8 lanes of 50 Gbps NRZ electrical signals on both the host-facing and cable-facing sides.

Figure 3A:
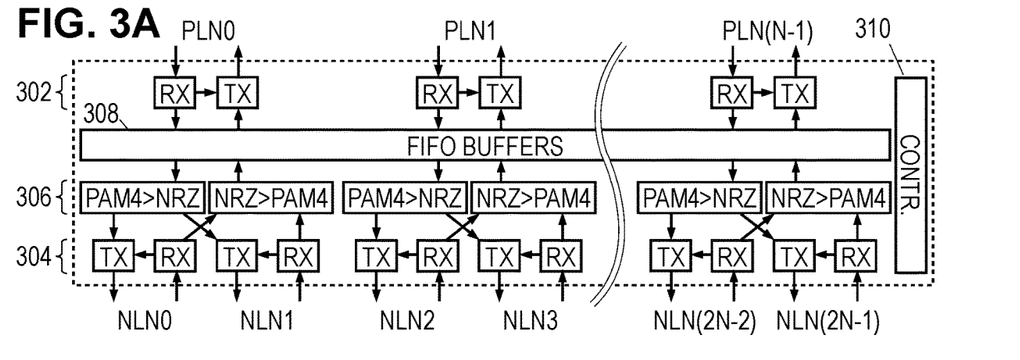
FIG. 3A is a function-block diagram of an illustrative gearbox transceiver embodiment.

FIG. 3A is a function block diagram of an illustrative transceiver that includes gearbox functionality. The transceiver includes a first set of transmitters and receivers 302 and a second set of transmitters and receivers 304. In FIG. 3A, the first set 302 is for high-rate lanes (e.g., 50 Gbps PAM4) and the second set 304 is for low-rate lanes (e.g., 25 Gbps NRZ). The gearbox functionality is provided by a set 306 of format converters. In FIG. 3A, set 306 is shown as including PAM4-to-NRZ converters and NRZ-to-PAM4 converters. The PAM4-to-NRZ converters each accept a data stream of PAM4 symbols produces two NRZ bit streams. In at least some embodiments, the PAM4-to-NRZ converters decode the PAM4 symbols using Gray coding to obtain the corresponding data bits, and allocate one bit from each symbol to each NRZ bit stream. Conversely, the NRZ-to-PAM4 converters each accept two NRZ bit streams and convert them to a data stream of PAM4 symbols. The NRZ-to-PAM4 converters take a bit from each bit stream and apply Gray coding to obtain each PAM4 symbol.

In other contemplated embodiments, the set 306 of format converters may be multiplexers and demultiplexers that provide 2-to-1 lane+rate conversion. For example, a lane multiplexer may accept two lanes (i.e., two data streams) of PAM4 symbols and produce one lane (i.e., one data stream) of PAM4 symbols having twice the symbol rate of the input lanes. A corresponding lane demultiplexer would accept one input lane of PAM4 symbols and produce two lanes of PAM4 symbols having half the symbol rate of the input lane. As another example, a lane multiplexer may accept two lanes (i.e., two bit streams) of NRZ bits and produce one lane (i.e., one bit stream) of NRZ bits having twice the bit rate of the input lanes. A corresponding lane demultiplexer would accept one input lane of NRZ bits and produce two lanes of NRZ bits having half the symbol rate of the input lane.

PAM4-to-NRZ conversion can also be combined with lane+rate conversion, such that, e.g., one input lane of PAM4 symbols is converted into four output lanes of NRZ bits having half the symbol rate of the input lane, and four input lanes of NRZ bits are converted into one output lane of PAM4 symbols.

A memory 308 provides FIFO buffering between the transmitter and receiver sets 302, 304. Note that the order of the converters 306 and the memory 308 can be switched between the transmitter and receiver sets 302, 304. A controller 310 coordinates the operation of the transmitters and receivers by, e.g., setting initial equalization parameters and ensuring the training phase is complete across all lanes and links before enabling the transmitters and receiver to enter the data transfer phase.

Figure 6:
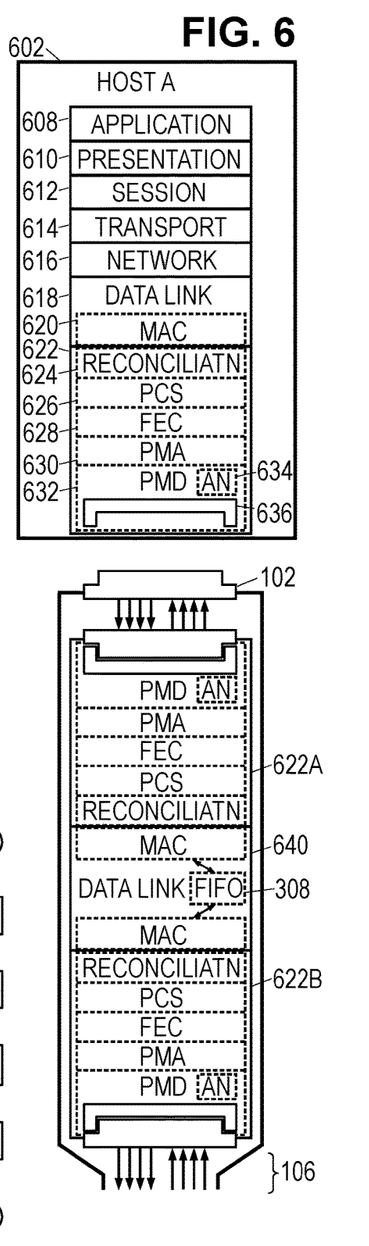
FIG. 6 is an architecture diagram for an active cable connector.

Referring momentarily to FIG. 6, the PAM4-to-NRZ and/or 2-to-1 lane+rate conversion may conceptually be performed at the Data Link Layer 640, i.e., sandwiched between optional FEC and PCS sublayer processing by the Physical Layers 622A, 622. In some variations, the transceiver may omit the processing associated with some or all of the MAC, Reconciliation, PCS, and FEC Sublayers, performing the bit-to-lane remapping to bridge between lower sublayers such as FEC or even PMA. In some embodiments, the FEC sublayer is implemented on just the host-facing side or just the cable-facing side. In other embodiments, the bit-to-lane remapping is performed to bridge between FEC sublayers on both sides.

Figure 3B:
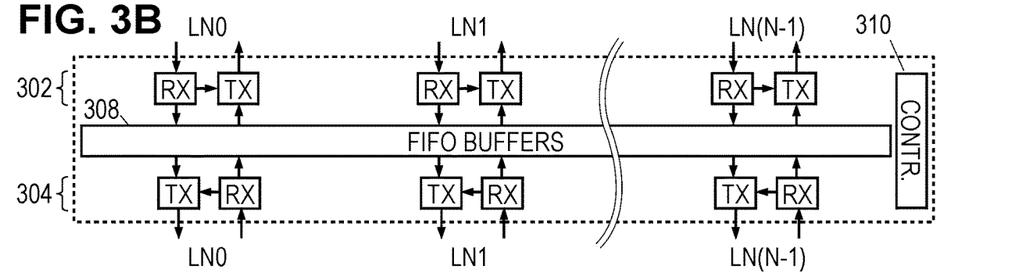
FIG. 3B is a function-block diagram of an illustrative CDR transceiver embodiment.

FIG. 3B is a function block diagram of an illustrative transceiver that omits the gearbox functionality, but includes the other components described above. The transceiver embodiment of FIG. 3B has the same number of lanes in each direction (host-facing and cable-facing) using the same signaling formation (PAM4 or NRZ), whereas the embodiment of FIG. 3A changes the signaling formation and provides twice as many lanes in one direction as the other.

In at least some contemplated embodiments, the host-facing set of transmitters and receivers employs fixed equalization parameters that are cable-independent, i.e., they are not customized on a cable-by-cable basis. The cable-facing set of transmitters and receivers preferably employs cable-dependent equalization parameters that are customized on a cable-by-cable basis. The cable-dependent equalization parameters may be adaptive or fixed, and initial values for these parameters may be determined during manufacturer tests of the cable. The equalization parameters may include filter coefficient values for pre-equalizer filters in the transmitters, and gain and filter coefficient values for the receivers.

Figure 4:
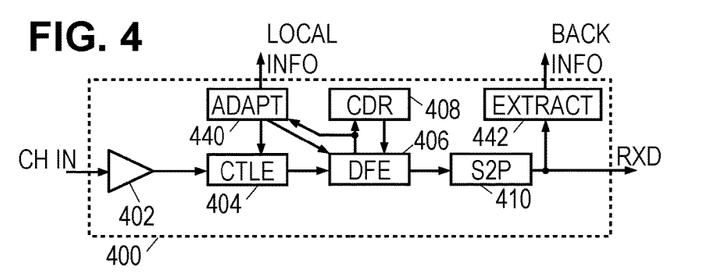
FIG. 4 is a block diagram of an illustrative receiver.
Figure 5:
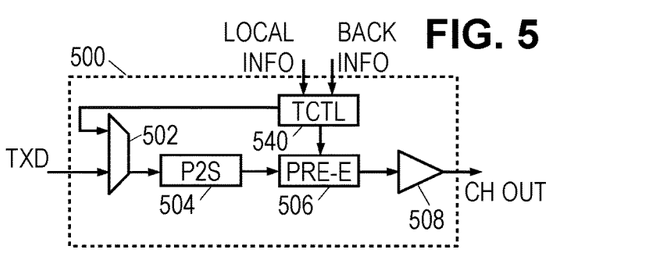
FIG. 5 is a block diagram of an illustrative transmitter.

FIGS. 4 and 5 are block diagrams of an illustrative receiver and an illustrative transmitter that may be used to implement the sets 302, 304. In FIG. 4, receiver 400 receives an analog electrical signal (CH_IN) and supplies it to a low noise amplifier (LNA) 402. The LNA 402 provides a high input impedance to minimize channel loading and amplifies the received electrical signal to drive the input of a continuous time linear equalizer (CTLE) filter 404. CTLE 404 provides continuous time filtering to shape the signal spectrum to reduce the length of the channel impulse response while minimizing leading inter-symbol interference (151). A decision feedback equalizer (DFE) 406 operates on the filtered signal to correct for trailing ISI and detect each transmitted channel bit or symbol, thereby producing a demodulated digital data stream. Some embodiments employ oversampling. A clock and data recovery (CDR) circuit 408 extracts a clock signal from the filtered signal and/or the digital data stream and supplies it to DFE 406 to control sample and symbol detection timing. A serial-to-parallel circuit 410 groups the digital data stream bits or symbols into blocks to enable the use of lower clock rates for subsequent on-chip operations. The symbols or data blocks are placed on the digital receive bus (RXD) for retransmission to the remote end node by a transmitter.

While certain contemplated cable embodiments do not support auto-negotiation, other contemplated embodiments do support auto-negotiation in accordance with the Ethernet standard. When supported, the auto-negotiation may be implemented as described in PCT/CN2017/075961, titled "Ethernet link extension method and device" by inventors Yifei Dai, Haoli Qian, and Jeff Twombly, and filed 2017 Mar. 8. A detector or packet information extractor 442 monitors the receive signal for the end of the auto-negotiation phase and/or the beginning of the training phase frames.

During the training phase, a filter adaptation circuit 440 measures an error between the input and output of a decision element in DFE 406, employing that error in accordance with well-known techniques from the literature on adaptive filtering to determine adjustments for the coefficients in CTLE filter 404, DFE 406, and a transmit filter 506 (discussed further below), and to determine whether convergence has been achieved. The locally-generated information (LOCAL_INFO) including the transmit filter coefficient adjustments and the convergence status are provided to the local transmitter 500 that communicates in the reverse direction on the data lane. As discussed below, the local transmitter communicates the transmit filter adjustments and the convergence status via a back-channel to the source of the CH_IN signal. In that vein, the received signal includes back-channel information from the source of the CH_IN signal. A packet information extractor 442 detects the back-channel information (BACK_INFO) and passes it to the local transmitter. Once convergence is achieved, receiver 400 is ready to begin normal operations.

In FIG. 5, transmitter 500 receives blocks of channel bits or symbols for transmission to the source of the CH_IN signal (FIG. 4). During normal operations, multiplexer 502 supplies blocks of channel bits or symbols from the remote source (received on the TXD bus) to the parallel to serial (P2S) circuit 504. P2S circuit converts the blocks into a digital data stream. A transmit filter 506, also called a pre-emphasis filter, converts the digital data stream into an analog electrical signal with spectral shaping to combat channel degradation. Driver 508 amplifies the analog electrical signal to drive the channel output (CH_OUT) node.

If supported, the auto-negotiation phase may be implemented as set forth in Y.Dai et al. During the training phase, multiplexer 502 obstructs information from the TXD bus, instead supplying P2S circuit 504 with training frames from a training controller 540. The training controller 540 generates the training frames based on the convergence status and transmit filter coefficient adjustments (LOCAL_INFO) received from the local receiver 400. That is, in addition to training patterns, the training frames include backchannel information to be used by the remote end of the channel. Note that even after the local receiver indicates filter convergence has occurred, the training controller 540 may prolong the training phase to coordinate training phase timing across lanes and along each link of the channel. The training frames include training sequences as specified by the relevant portions of the current Ethernet standard (IEEE Std 802.3).

The training controller 540 further accepts the back-channel information (BACK_INFO) extracted by the local receiver from received training frames sent by the local end node. The training controller applies the corresponding adjustments to the coefficients of transmit filter 506. Upon conclusion of the training phase, multiplexer 502 begins forwarding TxD blocks to the P2S circuit 504.

FIG. 6 is an architecture diagram of the network interface of a host device 602 and a cable connector 102 having one of the illustrative transceivers discussed previously. The architecture is expressed in terms of the ISO/IEC Model for Open Systems Interconnection (See ISO/IEC 7498-1: 1994.1) for communications over a physical medium such as conductors 106. The interconnection reference model employs a hierarchy of layers with defined functions and interfaces to facilitate the design and implementation of compatible systems by different teams or vendors. While it is not a requirement, it is expected that the higher layers in the hierarchy will be implemented primarily by software or firmware operating on programmable processors while the lower layers may be implemented as application-specific integrated circuits or similarly-dedicated hardware.

The Application Layer 608 is the uppermost layer in the model, and it represents the user applications or other software operating on different systems that need a facility for communicating messages or data. The Presentation Layer 610 provides such applications with a set of application programming interfaces (APIs) that provide formal syntax along with services for data transformations (e.g., compression), establishing communication sessions, connectionless communication mode, and negotiation, to enable the application software to identify the available service options and select therefrom. The Session Layer 612 provides services for coordinating data exchange including: session synchronization, token management, full- or half-duplex mode implementation, and establishing, managing, and releasing a session connection. In connectionless mode, the Session Layer may merely map between session addresses and transport addresses.

The Transport Layer 614 provides services for multiplexing, end-to-end sequence control, error detection, segmenting, blocking, concatenation, flow control on individual connections (including suspend/resume), and implementing end-to-end service quality specifications. The focus of the Transport Layer 614 is end-to-end performance/behavior. The Network Layer 616 provides a routing service, determining the links used to make the end-to-end connection and when necessary acting as a relay service to couple together such links. The Data link layer 618 serves as the interface to physical connections, providing delimiting, synchronization, sequence and flow control across the physical connection. It may also detect and optionally correct errors that occur across the physical connection. The Physical layer 622 provides the mechanical, electrical, functional, and procedural means to activate, maintain, and deactivate channels, and to use the channels for transmission of bits across the physical media 106.

The Data Link Layer 618 and Physical Layer 622 are subdivided and modified slightly by IEEE Std 802.3-2015, which provides a Media Access Control (MAC) Sublayer 620 in the Data Link Layer 618 to define the interface with the Physical Layer 622, including a frame structure and transfer syntax. Within the Physical Layer 622, the standard provides a variety of possible subdivisions such as the one illustrated in FIG. 6, which includes an optional Reconciliation Sublayer 624, a Physical Coding Sublayer (PCS) 626, a Forward Error Correction (FEC) Sublayer 628, a Physical Media Attachment (PMA) Sublayer 630, a Physical Medium Dependent (PMD) Sublayer 632, and an Auto-Negotiation (AN) Sublayer 634.

The optional Reconciliation Sublayer 624 merely maps between interfaces defined for the MAC Sublayer 620 and the PCS Sublayer 626. The PCS Sublayer 626 provides scrambling/descrambling, data encoding/decoding (with a transmission code that enables clock recovery and bit error detection), block and symbol redistribution, PCS alignment marker insertion/removal, and block-level lane synchronization and deskew. To enable bit error rate estimation by components of the Physical Layer 622, the PCS alignment markers typically include Bit-Interleaved-Parity (BIP) values derived from the preceding bits in the lane up to and including the preceding PCS alignment marker.

The FEC Sublayer 628 provides, e.g., Reed-Solomon coding/decoding that distributes data blocks with controlled redundancy across the lanes to enable error correction. In some embodiments (e.g., in accordance with Article 91 or proposed Article 134 for the IEEE Std 802.3), the FEC Sublayer 628 modifies the number of lanes (Article 91 provides for a 20-to-4 lane conversion).

The PMA Sublayer 630 provides lane remapping, symbol encoding/decoding, framing, and octet/symbol synchronization. The PMD Sublayer 632 specifies the transceiver conversions between transmitted/received channel signals and the corresponding bit (or digital symbol) streams. An optional AN Sublayer 634 is shown here as a internal element of the PMD Sublayer 632, and it implements an initial start-up of the communications channels to conduct an auto-negotiation phase and a link-training phase before entering a normal operating phase. The auto-negotiation phase enables the end nodes to exchange information about their capabilities, and the training phase enables the end nodes to adapt both transmit-side and receive-side equalization filters in a fashion that combats the channel non-idealities.

A receptacle 636 is also shown as part of the PMD sublayer 632 to represent the physical network interface port. The connector 102 has a plug that mates with the receptacle 636 of the host device 602. Within the connector, the transceiver may implement a host-facing Physical Layer 622A, a cable-facing Physical Layer 622B, and a Data Link Layer 640 that bridges together the two Physical Layers.

The MAC, Reconciliation, PCS, FEC, PMA, and PMD Sublayers, may be implemented as application-specific integrated circuitry to enable high-rate processing and data transmission. The receiver and transmitter sets 302, 304, may implement the PMA and PMD sublayers. More information regarding the operation of the various layers and sublayers, as well as the electrical and physical specifications of the connections between the nodes and the communications medium (e.g., pin layouts, line impedances, signal voltages & timing), and the electrical and physical specifications for the communications medium itself (e.g., conductor arrangements in copper cable, limitations on attenuation, propagation delay, signal skew), can be found in the current Ethernet standard and proposed updates thereto, and any such details should be considered to be well within the knowledge of those having ordinary skill in the art.

Figure 7:
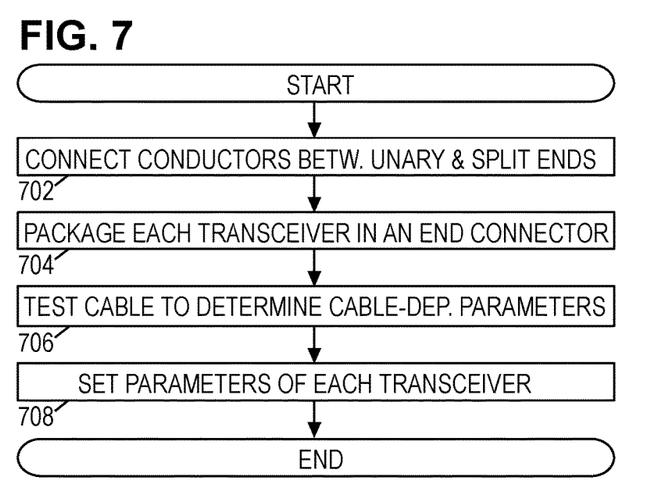
FIG. 7 is a flow diagram of an illustrative cable manufacturing method.

FIG. 7 is a flowchart of an illustrative cable manufacturing method. It begins in block 702 with connecting the electrical conductors between the unary end connector and the split end connectors, typically by soldering the wire ends to pads of circuit boards attached to the connector plugs. Traces on the circuit board may directly connect the pads to the pins of the connector plug. Alternatively, the traces may connect a chip with an integrated circuit transceiver or redriver between the pads and the pins of the connector plug. This and the ensuing steps may be performed by automated manufacturing/testing equipment. In block 704, the equipment packages the circuit boards (including any integrated circuit components) in a respective end connector for the network cable. The connectors are adapted to mate with network interface ports of host devices, and include plugs that electrically connect with matching receptacles in the ports.

In block 706, the equipment tests the cable to verify compliance with performance specifications and to determine cable-dependent equalization parameters for use by the cable-facing transmitter and receiver sets. In block 708, the equipment causes the transceivers to store the equalization parameters (including both cable-dependent and cable-independent parameters) in nonvolatile memory. The cable may then be packaged and sold to customers.

Though the foregoing description has focused mainly on a 1:4 breakout cable design, the disclosed principles are also applicable to other cable designs, including 1:2, 1:8, and 1:16 breakout cable designs. Each 100 Gbps PAM4 lane may transport PAM4 symbols at 53.125 Gbaud. Each 50 Gbps PAM4 may transport PAM4 symbols at 26.5625 Gbaud, while each 25 Gbps NRZ lane may transport NRZ symbols at 26.5625 Gbaud. The lanes can be ganged together in accordance with the Ethernet standard to provide 25 Gbps, 50 Gbps, 100 Gbps, 200 Gbps, 400 Gbps, or 800 Gbps. Other standards can also be supported, with the connector transceivers providing in-line format conversion and lane multiplexing/demultiplexing.

Numerous alternative forms, equivalents, and modifications will become apparent to those skilled in the art once the above disclosure is fully appreciated. It is intended that the claims be interpreted to embrace all such alternative forms, equivalents, and modifications that are encompassed in the scope of the appended claims.

What is claimed is:

1. An active 1:N breakout cable that comprises:
a unary end connector connected by electrical conductors to each of N split end connectors, N being an integer greater than 1,
the unary end connector being adapted to fit into a network interface port of a primary host device to provide first output electrical signals that convey a multi-lane outbound data stream to the primary host device at a first symbol rate and to accept first input electrical signals that convey multi-lane inbound data stream from the primary host device at the first symbol rate, and
each of the split end connectors being adapted to fit into a network interface port of a secondary host device to provide second output electrical signals that convey a split portion of the inbound data stream to that secondary host device at a second symbol rate and to accept second input electrical signals that convey a split portion of the outbound data stream from that secondary host device at the second symbol rate, the second symbol rate being half of the first symbol rate,
wherein the first output electrical signals, the first input electrical signals, the second output electrical signals, and the second input electrical signals, are each PAM4 electrical signals.

2. An active 1:N breakout cable that comprises:
a unary end connector connected by electrical conductors to each of N split end connectors, N being an integer greater than 1,
the unary end connector being adapted to fit into a network interface port of a primary host device to provide first output electrical signals that convey a multi-lane outbound data stream to the primary host device at a first symbol rate and to accept first input electrical signals that convey multi-lane inbound data stream from the primary host device at the first symbol rate, and
each of the split end connectors being adapted to fit into a network interface port of a secondary host device to provide second output electrical signals that convey a split portion of the inbound data stream to that secondary host device at a second symbol rate and to accept second input electrical signals that convey a split portion of the outbound data stream from that secondary host device at the second symbol rate, the second symbol rate being half of the first symbol rate,
wherein the first output electrical signals, the first input electrical signals, the second output electrical signals, and the second input electrical signals, are each NRZ electrical signals.

3. An active 1:N breakout cable that comprises:
a unary end connector connected by electrical conductors to each of N split end connectors, N being an integer greater than 1,
the unary end connector being adapted to fit into a network interface port of a primary host device to provide first output electrical signals that convey a multi-lane outbound data stream to the primary host device at a first symbol rate and to accept first input electrical signals that convey multi-lane inbound data stream from the primary host device at the first symbol rate, and each of the split end connectors being adapted to fit into a network interface port of a secondary host device to provide second output electrical signals that convey a split portion of the inbound data stream to that secondary host device at a second symbol rate and to accept second input electrical signals that convey a split portion of the outbound data stream from that secondary host device at the second symbol rate, the second symbol rate being half of the first symbol rate, wherein the unary end connector includes a transceiver that performs clock and data recovery on the first input electrical signals to extract and re-modulate the inbound data stream as diverging transit signals that transport the split portions of the inbound data stream via the electrical conductors to the split end connectors, and wherein the transceiver performs clock and data recovery on converging transit signals to extract and re-modulate the outbound data stream as said first output electrical signals, wherein the diverging transit signals and the converging transit signals use the second symbol rate.

4. The active 1:N breakout cable of claim 3, wherein the transceiver in the unary end connector further performs forward error correction when extracting the outbound data stream.

5. The cable of claim 3, wherein each of the split end connectors includes a redriver circuit that provides the second output electrical signals by amplifying the diverging transit signals that it receives, and wherein the redriver circuit provides at least one of the converging transit signals by amplifying the second input electrical signals that it receives.

6. The cable of claim 3, wherein each of the split end connectors includes a transceiver that performs clock and data recovery on the diverging transit signals that it receives to extract and re-modulate the split portion of the inbound data stream, and wherein the transceiver in each split end connector performs clock and data recovery on the second input electrical signals to extract and re-modulate the split portion of the outbound data stream.

7. The cable of claim 6, wherein the transceiver in each split end connector further performs forward error correction when extracting the split portion of the inbound data stream.

8. An active 1:N breakout cable that comprises:

a unary end connector connected by electrical conductors to each of N split end connectors, N being an integer greater than 1, the unary end connector being adapted to fit into a network interface port of a primary host device to provide first output electrical signals that convey a multi-lane outbound data stream to the primary host device at a first symbol rate and to accept first input electrical signals that convey multi-lane inbound data stream from the primary host device at the first symbol rate, and each of the split end connectors being adapted to fit into a network interface port of a secondary host device to provide second output electrical signals that convey a split portion of the inbound data stream to that secondary host device at a second symbol rate and to accept second input electrical signals that convey a split portion of the outbound data stream from that secondary host device at the second symbol rate, the second symbol rate being half of the first symbol rate, wherein the unary end connector includes a transceiver that performs clock and data recovery on the first input electrical signals to extract and re-modulate the inbound data stream as diverging transit signals that transport the split portions of the inbound data stream via the electrical conductors to the split end connectors, and wherein the transceiver performs clock and data recovery on converging transit signals to extract and re-modulate the outbound data stream as said first output electrical signals, wherein the diverging transit signals and the converging transit signals use the first symbol rate, wherein each of the split end connectors includes a transceiver that performs clock and data recovery on the diverging transit signals that it receives to extract and re-modulate the split portion of the inbound data stream, and wherein the transceiver in each split end connector performs clock and data recovery on the second input electrical signals to extract and re-modulate the split portion of the outbound data stream.

9. The cable of claim 8, wherein the transceiver in each split end connector further performs forward error correction when extracting the split portion of the inbound data stream.

10. An active 1:N breakout cable that comprises:

a unary end connector connected by electrical conductors to each of N split end connectors, N being an integer greater than 1, the unary end connector being adapted to fit into a network interface port of a primary host device to provide first output electrical signals that convey a multi-lane outbound data stream to the primary host device at a first symbol rate and to accept first input electrical signals that convey multi-lane inbound data stream from the primary host device at the first symbol rate, and each of the split end connectors being adapted to fit into a network interface port of a secondary host device to provide second output electrical signals that convey a split portion of the inbound data stream to that secondary host device at a second symbol rate and to accept second input electrical signals that convey a split portion of the outbound data stream from that secondary host device at the second symbol rate, the second symbol rate being half of the first symbol rate, wherein each of the split end connectors includes a transceiver that performs clock and data recovery on the second input electrical signals to extract and re-modulate the split portion of the outbound data stream as one or more of converging transit signals that transport the split portions of the inbound data stream via the electrical conductors to the unary end connector, and wherein the transceiver performs clock and data recovery on diverging transit signals to extract and re-modulate the split portion of the inbound data stream as said second output electrical signals.

11. The cable of claim 10, wherein the diverging transit signals and the converging transit signals use the first symbol rate.

12. The cable of claim 11, wherein the unary end connector includes a transceiver that performs clock and data recovery on the first input electrical signals to extract and re-modulate the inbound data stream as the diverging transit signals that transport the split portions of the inbound data stream via the electrical conductors to the split end connectors, and wherein the transceiver in the unary end connector performs clock and data recovery on the converging transit signals to extract and re-modulate the outbound data stream as said first output electrical signals.

13. The cable of claim 12, wherein the transceiver in the unary end connector further performs forward error correction when extracting the outbound data stream.

14. A cable manufacturing method that comprises:
packaging a transceiver into a unary end connector that is adapted to mate with a network interface port of a primary host device, the transceiver being configured to provide first output electrical signals that convey a multi-lane outbound data stream to the primary host device at a first symbol rate and to accept first input electrical signals that convey multi-lane inbound data stream from the primary host device at the first symbol rate; and
connecting each of N split end connectors to the unary end connector with electrical conductors, where N is an integer greater than one, and where each of the split end connectors is adapted to mate with a network interface port of a secondary host device to provide second output electrical signals that convey a split portion of the inbound data stream to that secondary host device at a second symbol rate and to accept second input electrical signals that convey a split portion of the outbound data stream from that secondary host device at the second symbol rate, the second symbol rate being half of the first symbol rate,
the transceiver in the unary end connector being configured to perform clock and data recovery on the first input electrical signals to extract and re-modulate the inbound data stream as diverging transit signals that transport the split portions of the inbound data stream via the electrical conductors to the split end connectors, and further configured to perform clock and data recovery on converging transit signals to extract and re-modulate the outbound data stream as said first output electrical signals, and
wherein the diverging transit signals and the converging transit signals use the second symbol rate.

15. The cable manufacturing method of claim 14, wherein the first output electrical signals, the first input electrical signals, the second output electrical signals, and the second input electrical signals, are each PAM4 electrical signals.

16. The cable manufacturing method of claim 14, wherein the first output electrical signals, the first input electrical signals, the second output electrical signals, and the second input electrical signals, are each NRZ electrical signals.

17. A cable manufacturing method that comprises:
packaging a transceiver into each of N split end connectors adapted to mate with a network interface port of a secondary host device, where N is an integer greater than one, and where each of the transceivers in the split end connectors is configured to provide split end output electrical signals that convey a split portion of a multi-lane inbound data stream to that secondary host device at a second symbol rate and to accept split end input electrical signals that convey a split portion of a multi-lane outbound data stream from that secondary host device at the second symbol rate; and
connecting each of the split end connectors to a unary end connector via electrical conductors, the unary end connector being adapted to mate with a network interface port of a primary host device to provide unary end output electrical signals that convey the outbound data stream to the primary host device at a first symbol rate and to accept unary end input electrical signals that convey the inbound data stream from the primary host device at the first symbol rate, the second symbol rate being half the first symbol rate,
the transceiver in each split end connector being configured to perform clock and data recovery on the split end input electrical signals to extract and re-modulate the split portion of the outbound data stream as converging transit signals that transport the split portions of the outbound data stream via the electrical conductors to the unary end connector, and being further configured to perform clock and data recovery on diverging transit signals to extract and re-modulate the split portion of the inbound data stream as said split end output electrical signals, and
wherein the diverging transit signals and the converging transit signals use the first symbol rate.

18. The cable manufacturing method of claim 17, wherein the first output electrical signals, the first input electrical signals, the second output electrical signals, and the second input electrical signals, are each PAM4 electrical signals.

19. The cable manufacturing method of claim 17, wherein the first output electrical signals, the first input electrical signals, the second output electrical signals, and the second input electrical signals, are each NRZ electrical signals.

\* \* \* \* \*